United States Patent
Seghezzi

(10) Patent No.: US 8,807,649 B2
(45) Date of Patent: Aug. 19, 2014

(54) SYSTEM FOR ATTACHING A SADDLE TO A SEATPOST

(75) Inventor: Luigi Seghezzi, San Felice del Benaco (IT)

(73) Assignee: ITM Bike Components S.R.L., Grumello del Monte (BG) (IT)

( * ) Notice: Subject to any disclaimer, the term of this patent is extended or adjusted under 35 U.S.C. 154(b) by 38 days.

(21) Appl. No.: 14/009,290

(22) PCT Filed: Jul. 26, 2011

(86) PCT No.: PCT/IB2011/001733
§ 371 (c)(1),
(2), (4) Date: Oct. 1, 2013

(87) PCT Pub. No.: WO2012/017285
PCT Pub. Date: Feb. 9, 2012

(65) Prior Publication Data
US 2014/0056640 A1   Feb. 27, 2014

(30) Foreign Application Priority Data
Aug. 2, 2010  (IT) .............................. BG2010A0044

(51) Int. Cl.
*B62J 1/00* (2006.01)
(52) U.S. Cl.
USPC .................................................... 297/215.15

(58) Field of Classification Search
USPC ............. 297/195.1, 215.14, 215.15; 403/389, 403/391
See application file for complete search history.

(56) References Cited

U.S. PATENT DOCUMENTS

| 2,211,600 A | 8/1940 | Faulhaber |
| 2,446,933 A | 8/1948 | Jones |
| 4,915,538 A | 4/1990 | Golden et al. |
| 5,295,727 A * | 3/1994 | Kao .......................... 297/215.14 |
| 5,547,155 A * | 8/1996 | Herting ..................... 297/215.15 |
| 6,827,397 B1 * | 12/2004 | Driver ....................... 297/215.14 |
| 7,407,225 B2 * | 8/2008 | Bigolin ..................... 297/215.14 |

FOREIGN PATENT DOCUMENTS

| FR | 1403489 A | 6/1965 |
| GB | 616129 A | 1/1949 |
| GB | 960107 A | 6/1964 |

\* cited by examiner

*Primary Examiner* — Peter Brown
(74) *Attorney, Agent, or Firm* — King & Schickli, PLLC

(57) ABSTRACT

A system for coupling a saddle to a seatpost; said saddle comprising a fork (12) positioned below it; said seatpost (50) comprises a first pin (53) and a slot; said fork (12) comprising two lateral apertures bounded by a bar structure; said first pin (53) being insertable into said two lateral apertures; said first pin (53) comprising two heads (54, 55); said coupling system comprising an eccentric second pin (60) disposed in said slot; said first pin (53) and said eccentric second pin (60) each comprising two heads (54, 55, 61, 62), one per side, which abut against said bar-like structure bounding said two lateral apertures; said eccentric second pin (60) being rotatable.

5 Claims, 6 Drawing Sheets

SYSTEM FOR ATTACHING A SADDLE TO A SEATPOST

The present invention relates to a system for attaching (coupling/assembling) a saddle to a seatpost.

A bicycle saddle has to be fixed to the seatpost, and has normally to be adjustable in position (distance from the handlebar), and in inclination to a horizontal axis, the saddle height being adjusted by extracting or inserting the seatpost from or into the bicycle frame.

A head is normally glued, pressed or welded into the top of the seatpost. Two half-shells (or other mechanism) are typically fixed onto this head by gripping the saddle fork. One or more screws lock the saddle in the required position.

A single screw seatpost is very simple in structure, such an arrangement often being used in an attempt to reduce weight to a minimum.

However, in this case adjustment is more complicated because a single operation is used to adjust both the saddle position and its inclination.

An object of the present invention is to provide a system for coupling a saddle to a seatpost which enables complete adjustment to be easily achieved.

Another object is to provide a system for coupling a saddle to a seatpost which is of simple to implementation.

These and other objects are attained in accordance with the present invention by a system for coupling a saddle to a seatpost; said saddle comprising a fork positioned below it; characterised in that said seatpost comprises a first pin and a slot; said fork comprising two lateral apertures bounded by a bar structure; said first pin being insertable into said two lateral apertures; said first pin comprising two heads; said coupling system comprising an eccentric second pin disposed in said slot; said first pin and said eccentric second pin each comprising two heads, one per side, which abut against said bar-like structure bounding said two lateral apertures; said eccentric second pin being rotatable.

Further characteristics of the invention are described in the dependent claims.

The characteristics and advantages of the invention will be apparent from the ensuing detailed description of one embodiment thereof, illustrated by way of non-limiting example in the accompanying drawings, in which:

FIGS. 1*a* and 1*b* show a perspective and a front view of a saddle fork carriage, in accordance with a first embodiment of the present invention;

Figure 1A:
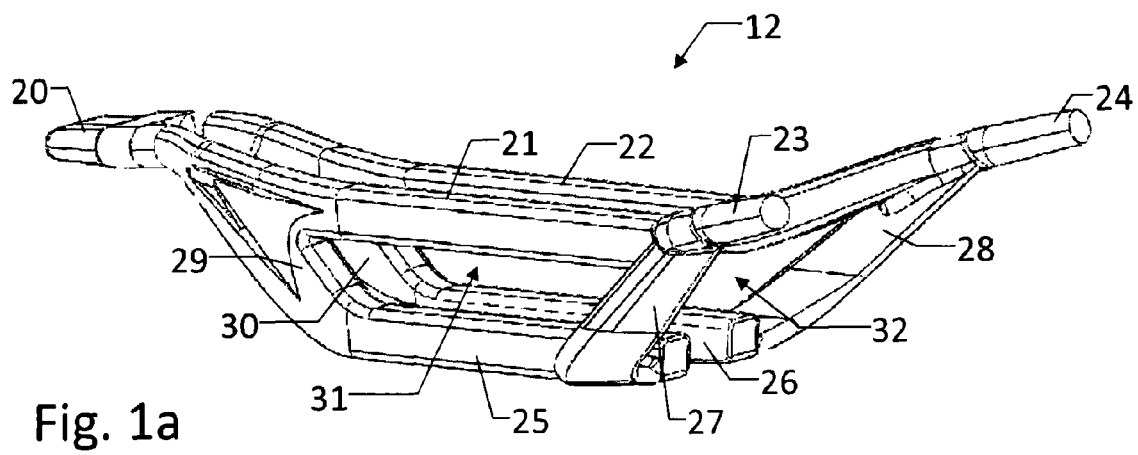
Figure 1B:
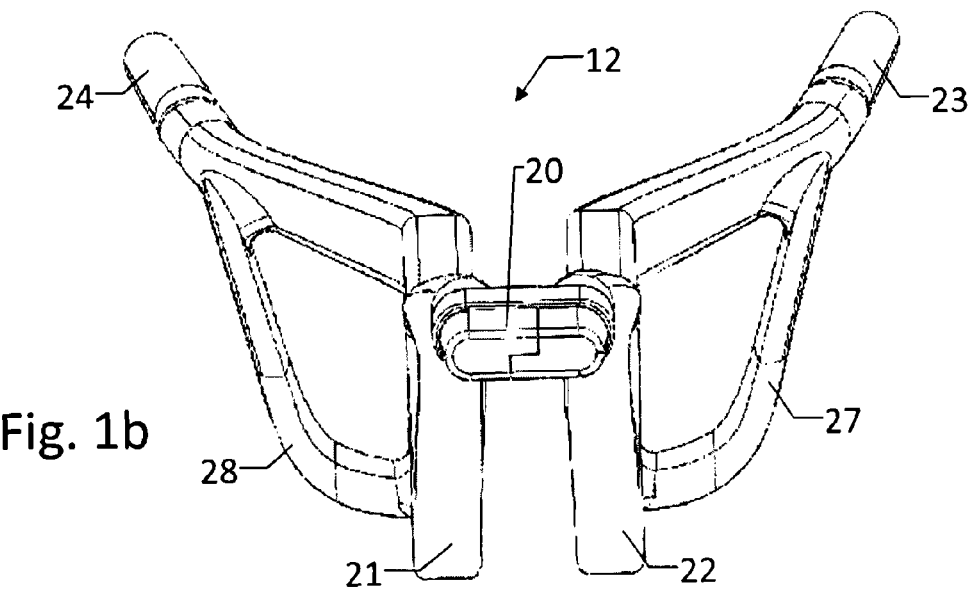
Figure 2:
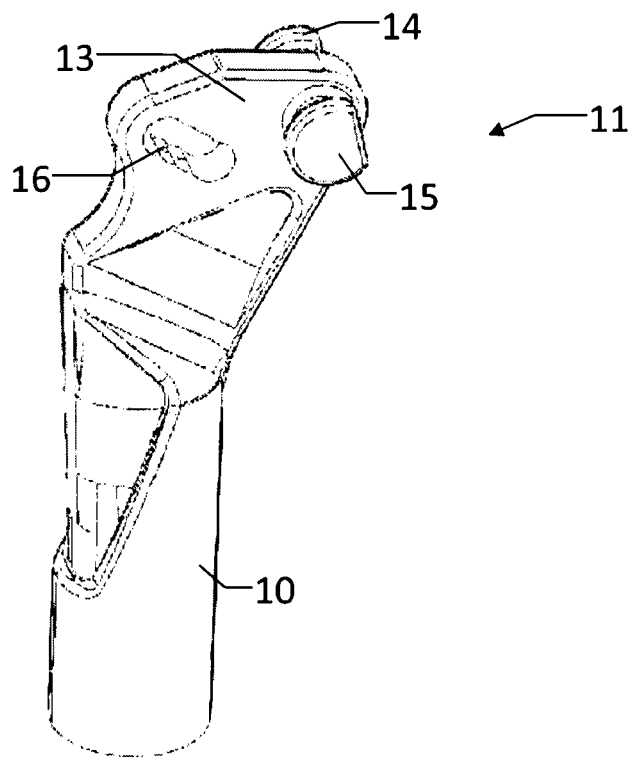
FIG. 2 shows a perspective view of a seatpost, in accordance with a first embodiment of the present invention.
Figure 3:
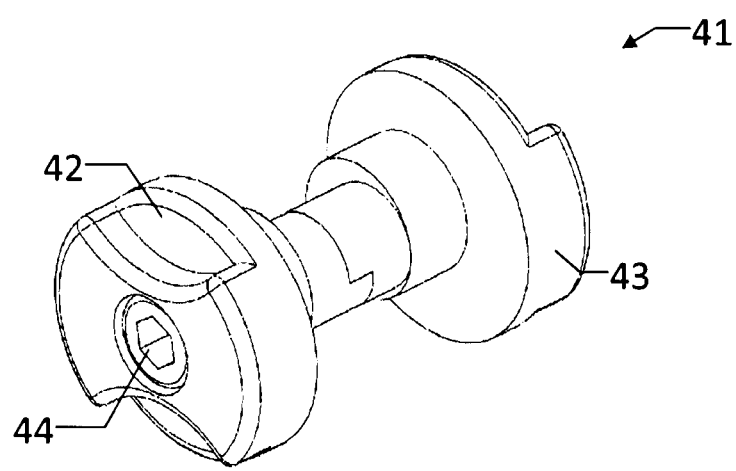
FIG. 3 shows a perspective view of an eccentric pin for coupling and adjusting a saddle to a seatpost, in accordance with a first embodiment of the present invention.
Figure 4A:
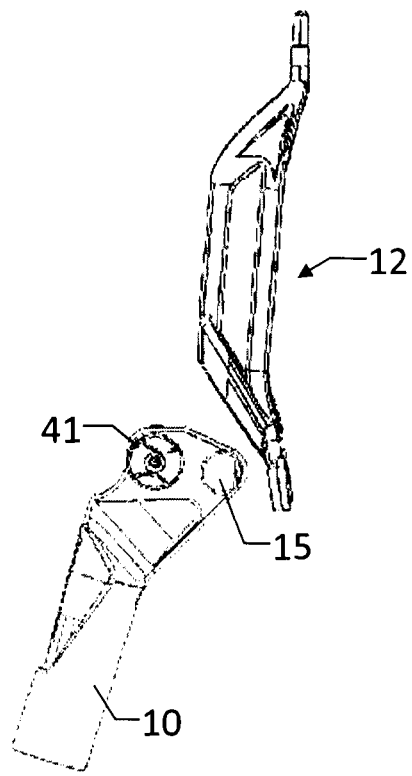
Figure 4B:
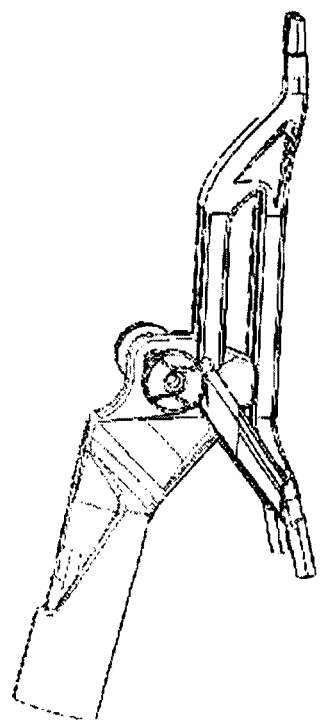
Figure 4C:
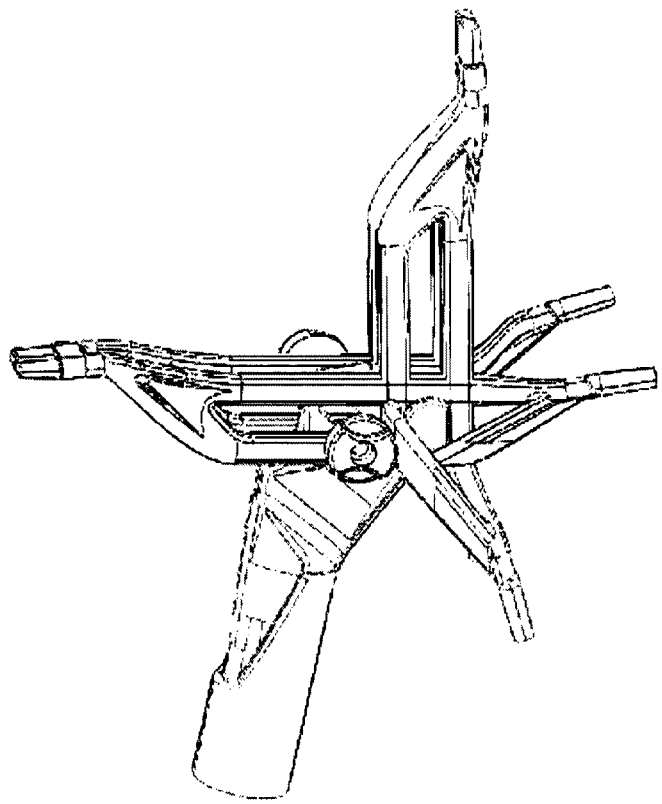
Figure 4D:
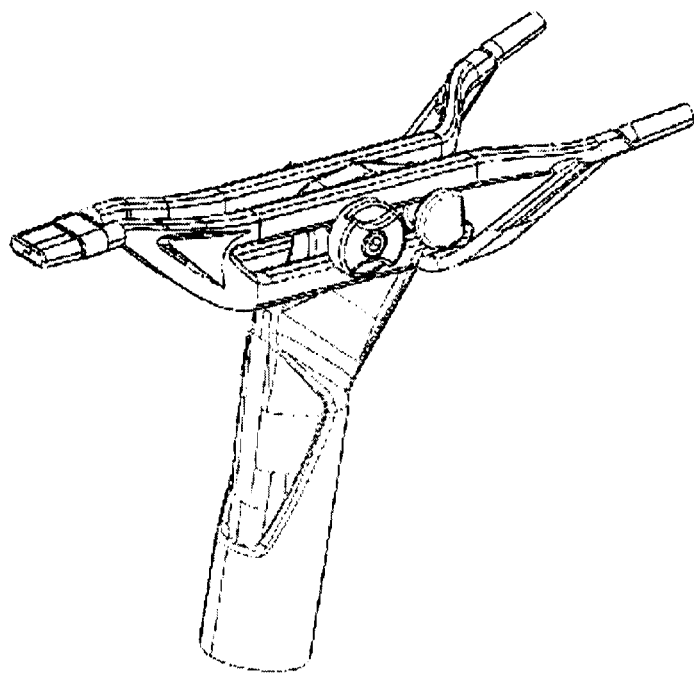
Figure 5:
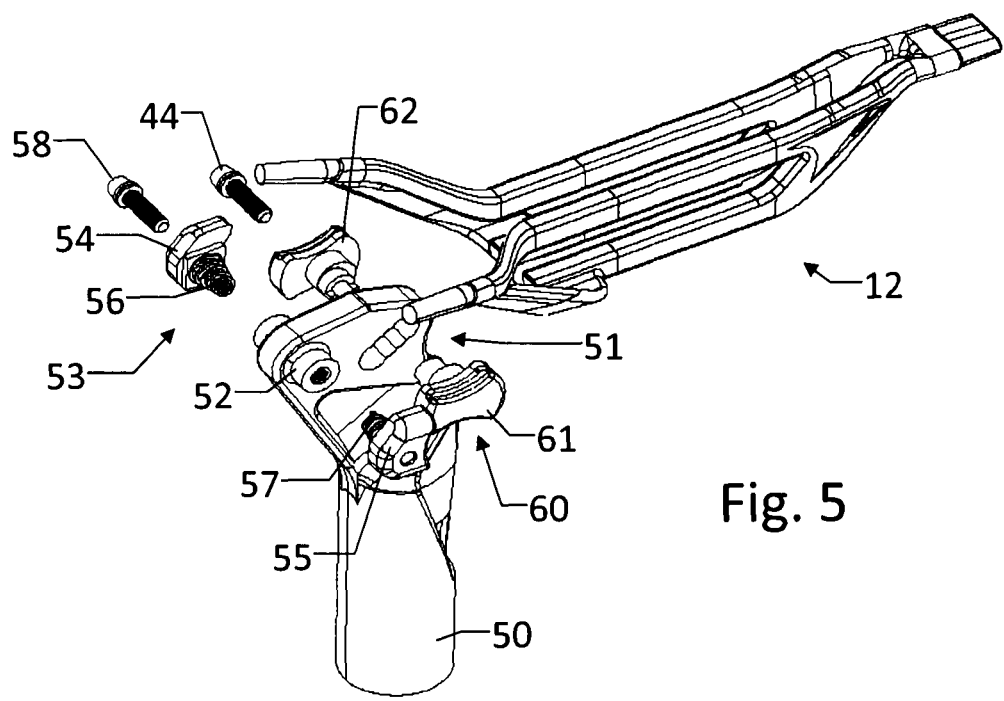
Figure 6A:
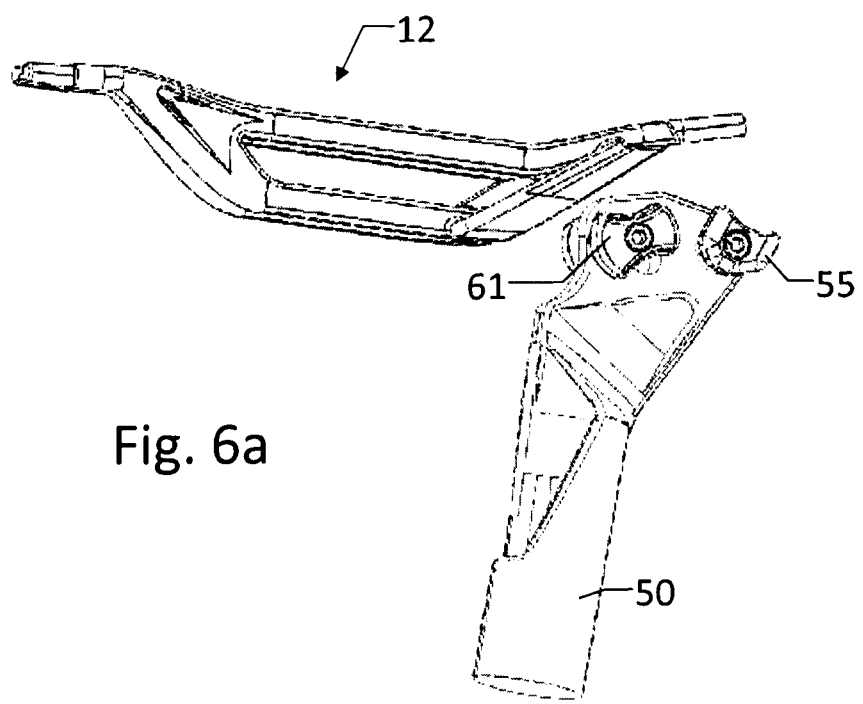
Figure 6B:
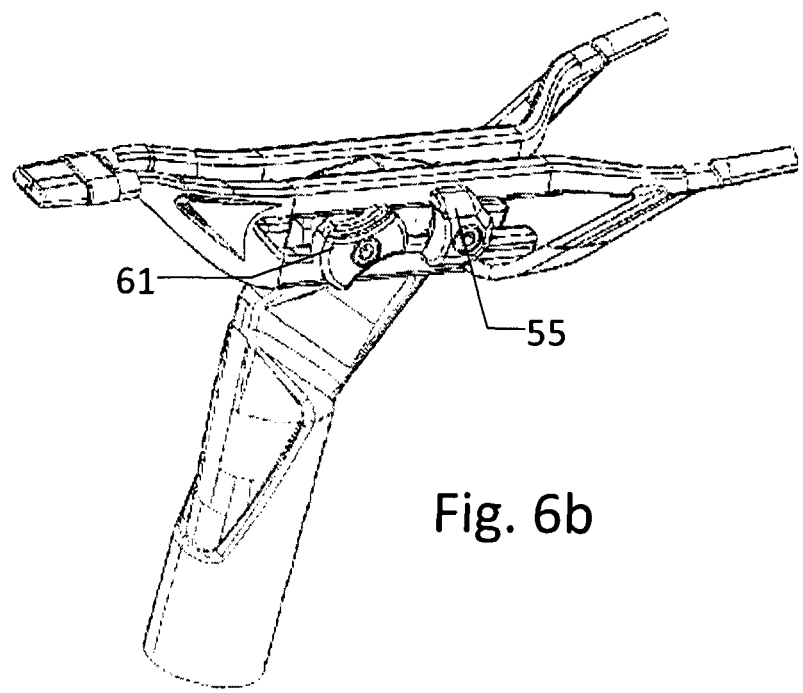
Figure 7:
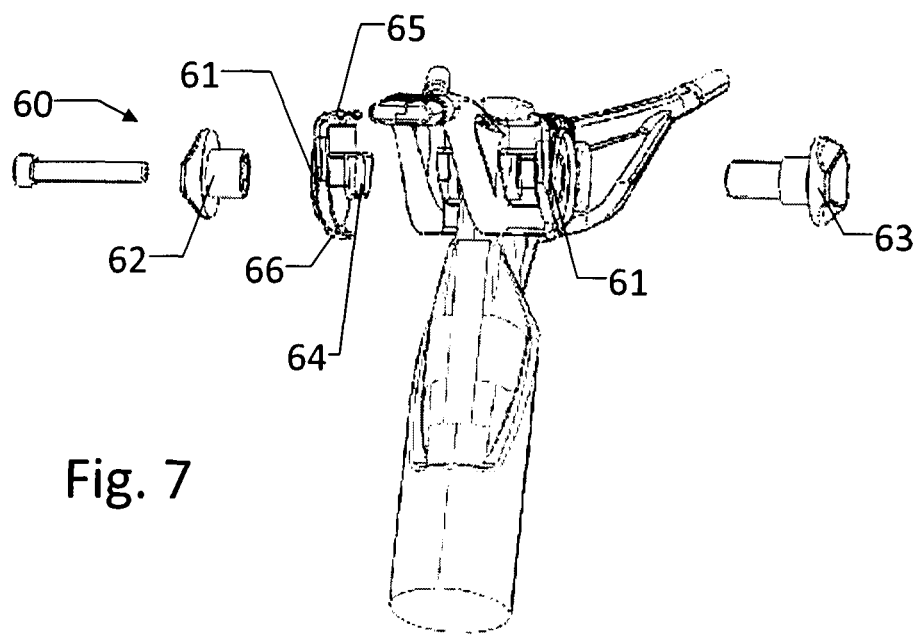

FIGS. 4*a*, 4*b*, 4*c* and 4*d* show the mounting of a saddle fork carriage on a seatpost, in accordance with a first embodiment of the present invention;

FIG. 5 is a perspective view showing a saddle fork carriage, a seatpost and an eccentric pin for coupling and adjusting a saddle to a seatpost, in accordance with a second embodiment of the present invention;

FIGS. 6*a* and 6*b* show the mounting of a saddle fork carriage on a seatpost, in accordance with a second embodiment of the present invention;

FIG. 7 is a perspective view showing a saddle fork carriage, a seatpost and an eccentric pin for coupling and adjusting a saddle to a seatpost, in accordance with a second embodiment of the present invention.

With reference to the accompanying figures, a system for coupling the saddle to the seatpost, in accordance with a first embodiment of the present invention, comprises a seatpost 10 having a head 11, and a saddle fork carriage 12 (rail-fork).

The head 11 is substantially a plate 13 positioned in a plane extending in the travel direction, and comprises a right rear pin 14 (fixed fulcrum) and a left rear pin 15 (fixed fulcrum) which are located one opposite the other at a rear end of the plate 13, and have a central axis perpendicular to the bicycle travel direction or the saddle longitudinal direction.

The pins 14 and 15 extend outwards from the plate 13, with a body of about 1 cm and with a predetermined diameter, and have a flat head of diameter greater than the body. The flat head has a circular shape from which a circular segment is lacking, the cord of which is positioned substantially vertical. The lack of the circular segment allows for mounting (by rotating the saddle) while at the same time providing an anti-fall function for the component.

At the front other end of the plate 13, opposite the pin 12, it presents a slot 16 (adjustable fulcrum) inclined by about 45°.

The slot 16 consists of four holes (the number of holes can vary) which form it by intersection. The slot 16 hence has its lateral walls each formed by four semicircles (semi-loops).

The fork carriage 12 is a bar structure in which two bars 21 and 22 diverge from a front vertex 20 and then extend mutually parallel through their central portion, and then further diverge from their central portion to each terminate with two rear vertices 23 and 24. Along their central portion the bars 21 and 22 are slightly lower than at their vertices 20, 23 and 24.

Below the bars 21 and 22, extending from the vertex 20 there are a further two bars 25 and 26 which diverge and extend lower than the bars 21 and 22, to then extend mutually parallel. From their rear end two further bars 27 and 28 extend which diverge upwards from the bars 25 and 26, to join together at the rear vertices 23 and 24.

Two substantially vertical bars 29 and 30 join the bars 21 and 22 to the respective bars 25 and 26 at the front end of their parallel portions.

The fork carriage 12 hence presents two lateral apertures 31 and 32 bounded upperly by the bars 21 (and 22), lowerly by the bars 25 (and 26), frontwards by the bars 29 (and 30) and rearwards by the bars 27 (and 28).

The saddle is not shown for clarity, the fork carriage 12 being fixed below the saddle in known manner. For example, it can be fixed by fixing the vertices 20, 23 and 24 to the bottom of the saddle by gluing into suitable seats provided in the saddle.

To fix the head 11 to the fork carriage 12, a fixing element 41 is used composed of a left eccentric head 42 and a right eccentric head 43 joined together by a screw 44. The pin, which joins the two heads 42 and 43 together, is not coaxial to the heads.

The eccentric heads 42 and 43 have a dimension greater than the height of the two apertures 31 and 32 to enable these to abut against them.

The head 11 can be produced separately and glued or otherwise fixed to the seatpost 10, or the head 11 can be produced in one piece with the seatpost 10. The materials of the head, of the seatpost of the saddle and of the structure below the saddle can be those normally used in this sector of the art.

To mount the saddle, i.e. the fork carriage 12, on the seatpost 10, the carriage 12 is positioned vertically and the pins 14 and 15 inserted through the two lateral apertures 31 and 32. The pins 14 and 15 pass inside the bars 27 and 28, and outside the bars 21, 22, 25 and 26.

The parts are dimensioned such that the pins 14 and 15 can be inserted through the two lateral apertures 31 and 32, to position the fork carriage 12 vertically to a seatpost for example positioned on a bicycle, by virtue of the circular sector missing from the head of the pins 14 and 15.

About the central stem of the pins 14 and 15, two rubber rings are preferably positioned to make contact with the inside of the bars of the fork carriage 12 to limit/prevent vibrations of the saddle.

The fork carriage 12 is then rotated into a horizontal position and the fixing element 41 is inserted into one of the four positions of the slot 16, it is slightly tightened, and the inclination and position of the saddle are adjusted by rotating it or sliding the carriage along the fulcrums, after which the screw 44 is completely tightened.

Each position of the slot 16 constitutes a fulcrum point into which to insert the fixing element 41, which is eccentric such that, when one of the heads 42 or 43 is rotated, the angular inclination of the saddle is varied (the tip of the saddle is raised or lowered). The saddle inclination is adjusted coarsely by positioning the fixing element 41 in a chosen hole of the slot 16, and then carrying out fine adjustment with the cam of the fixing element 41.

The fixing element 41 provides the second fulcrum point or adjustable fulcrum. Microadjustment is achieved by acting on the heads 42 and 43, which by being rotated clockwise or anticlockwise result in an upward or downward movement of the eccentric pins, the central pin being fixed by one of the holes in the slot 16. The result is a movement of the fork carriage 12 which, by having a fixed fulcrum point 14, 15 in the rear part and with the axis of the front pin 41 undergoing a variation, this means that by acting on the heads 42 or 43 the saddle tip is made to undergo an upward or downward movement.

The saddle remains connected to the seatpost in two points, one fixed by the pins 14 and 15 (fixed fulcrum point) and one free and adjustable by the fixing element 41 (adjustable fulcrum point).

The lack of the circular segments on the pins 14 and 15 represents a safety element preventing escape of the fork carriage 12 from the seatpost 10, in case of problems with the fixing element 41.

When the saddle has been rotated horizontally, the fact that the cord of the pins 14 and 15 is no longer aligned with the bars 21, 22, 25 and 26 means that the pins are unable to escape from the two lateral apertures 31 and 32 in the case of breakage or loss of the fixing element 41.

According to a second embodiment of the present invention, the system for coupling the fork carriage 12 to the seatpost comprises a seatpost 50 having a head 51 different from the preceding.

The head 51 is still substantially a plate 13 positioned in a plane extending in the travel direction and, as previously described, comprises at a front end of the plate 13 a slot 16 (adjustable fulcrum) inclined by about 45°. At its rear end a hole 52 is present in the pins 14 and 15, which project from the plate 13.

Inserted into the hole 52 there is a fixing element 53 composed of two heads 54 and 55 shaped left and right, joined together by a screw 58. Two springs 56 and 57 are positioned between the heads 54 and 55 and the plate 13.

The heads 54 and 55 are not circular but rectangular in shape with the minor side smaller than the height of the two apertures 31 and 32 and the major side greater than the height of the two apertures 31 and 32.

A fixing element 60 inserted through the slot 16 is of the aforedescribed type but with a left eccentric head 62 and a right eccentric head 61 not circular as before, but rectangular with the minor side smaller than the height of the two apertures 31 and 32 and the major side greater than the height of the two apertures 31 and 32.

For mounting, the fork carriage 12 is positioned to the front of the seatpost 50 at an angle of about 90° to its axis. The carriage 12 is then inserted by making the two lateral apertures 31 and 32 coincide with the heads 61 and 62.

When the carriage 12 has been inserted through the apertures it is shifted until the rear heads 54 and 55 are also completely inserted through the carriage 12. To facilitate insertion of the heads 54, 55, 61 and 62, these are aligned with the horizontal longer sides such that they can be inserted through the apertures 31 and 32.

The rear heads 54 and 55 are then rotated clockwise through about 90° and the screw 58 is screwed in but not tightened.

Once rotated, the rear heads 54 and 55 provide an anti-fall function in that even with the screws loose it is impossible to withdraw the fork carriage 12 from the seatpost 50.

The angular inclination of the saddle is adjusted by acting on either of the two heads 61 and 62, by rotating it clockwise or anticlockwise until the required angular inclination is achieved. The position of the fork carriage 12 is then adjusted by acting on it to position it longitudinally "forwards" or "rearwards". Having found the required position, the screws 58 and 44 are tightened.

In an advantageous embodiment, the fixing element 60 comprises two flanges 61 acting as "washers". They increase the closure surface between the eccentric heads 62 and 63 and the bars of the fork carriage 12.

These flanges 61 are of particular shape. The central part 64 is inserted into the two lateral apertures 31 and 32 of the fork carriage 12.

In addition, in their upper part 65 and lower part 66 they are shaped to embrace the upper and lower bars of the fork carriage 12.

This shaping consolidates the fork strength when this is stressed by a load, making it impossible for the upper and lower bars of the fork carriage to widen out.

The eccentric pins can also assume other forms. In this respect, to achieved a more rigid optimized connection between them, one pin can be much longer than the other, such that it penetrates until it reaches the opposite side of the holes provided in the seatpost, encountering the second cam with a half-moon insertion fit to thus cause the cams to rotate on a single pin, hence making the cam rotation smoother.

As can be noted from the description and from the accompanying drawings, the saddles present their fixed fulcrum point on one side of the plate and their adjustable fulcrum point on the other side. In a further embodiment, these points (fixed and adjustable) can be oppositely disposed.

The materials used for the system for coupling the saddle to the seatpost, and the dimensions, can be chosen at will according to requirements and to the state of the art.

The saddle is mounted directly on the seatpost head without the use to of intermediate coupling means.

The invention claimed is:

1. A combination of a saddle, a seatpost (10) positionable on a bicycle and a system for coupling the saddle to the seatpost (10) the seatpost (10) having a head (11); said head (11) is substantially a plate (13) which, in use, is adapted to be positioned in a plane extending in the bicycle travel direction; said head (11) comprises a right rear pin (14) and a left rear pin (15) which are located one opposite the other at a rear end of said plate (13), and have a central axis which, in use, is adapted to be perpendicular to the bicycle travel direction; at the front other end of said plate (13), opposite said right rear pin (14) and said left rear pin (15), said plate (13) presents a slot (16) inclined by about 45o; said saddle comprising a fork (12) positioned below it;

said slot (16) is produced by a plurality of holes which form it by mutual intersection; said fork (12) comprising two lateral apertures (31, 32) bounded by a bar structure (21, 22, 25, 26, 27, 28, 29, 30); said right rear pin (14) and said left rear pin (15) being insertable into said two lateral apertures (31, 32); each of said right rear pin (14) and of said left rear pin (15) comprising a head; said coupling system comprising an eccentric second pin (41, 60) rotatably disposed in one of said plurality of holes of said slot (16); said eccentric second pin (41, 60) comprising two heads, one per side; each of said heads of said right rear pin (14), of said left rear pin (15) and of said eccentric second pin (41, 60) abut against said bar-like structure (21, 22, 25, 26, 27, 28, 29, 30) bounding said two lateral apertures (31, 32); wherein the angular inclination of said saddle is adapted to be adjusted by rotating said eccentric second pin (41, 60) within said one of said plurality of holes of said slot (16).

2. The combination as claimed in claim 1, characterized in that said fork (12) comprises two substantially parallel upper bars (21, 22) and two substantially parallel lower bars (25, 26); two substantially vertical front bars (29, 30) joining said two substantially parallel upper bars (21, 22) and said two substantially parallel lower bars (25, 26) together at their front; two substantially C-shaped rear bars (27, 28) with their aperture one opposite the other joining said two substantially parallel upper bars (21, 22) and said two substantially parallel lower bars (25, 26) together at their rear.

3. The combination as claimed in claim 2, characterized in that each of said heads of said right rear pin (14), of said left rear pin (15) and of said eccentric second pin (41, 60) abuts laterally against one of said two substantially parallel upper bars (21, 22) and one of said two substantially parallel lower bars (25, 26).

4. The combination as claimed in claim 1, characterized in that said heads of said right rear pin (14) and of said left rear pin (15) are in the form of a circle lacking a circular segment.

5. The combination as claimed in claim 1, characterized in that said right rear pin (14) and said left rear (15) comprises two antivibration rubber rings.

* * * * *